United States Patent [19]

Morton

[11] Patent Number: 4,474,507

[45] Date of Patent: Oct. 2, 1984

[54] FLOW LINE BUNDLE AND METHOD OF TOWING SAME

[75] Inventor: Arthur W. Morton, Houston, Tex.

[73] Assignee: Conoco Inc., Ponca City, Okla.

[21] Appl. No.: 333,595

[22] Filed: Dec. 23, 1981

Related U.S. Application Data

[63] Continuation of Ser. No. 48,316, Jun. 14, 1979, Pat. No. 4,363,566.

[51] Int. Cl.³ ............................................... F16L 1/04
[52] U.S. Cl. .................................................... 405/158
[58] Field of Search ............... 405/158, 169, 170, 171, 405/172

[56] References Cited

U.S. PATENT DOCUMENTS

| | | |
|---|---|---|
| 2,297,165 | 9/1942 | Ringel . |
| 3,262,275 | 7/1966 | Perret . |
| 3,375,324 | 3/1968 | Miller .............................. 405/170 X |
| 3,526,086 | 9/1970 | Morgan . |
| 3,530,680 | 9/1970 | Gardner ............................. 405/169 |
| 3,677,302 | 7/1972 | Morgan ............................. 138/106 |
| 4,011,729 | 3/1977 | Kermel . |
| 4,041,719 | 8/1977 | Baugh ............................... 405/169 |
| 4,052,862 | 10/1977 | Lamy . |
| 4,075,862 | 2/1978 | Ames ................................ 405/169 |
| 4,107,933 | 8/1978 | Lamy . |
| 4,120,168 | 10/1978 | Lamy ................................ 405/170 |
| 4,135,844 | 1/1979 | Lamy ................................ 405/171 |
| 4,145,909 | 3/1979 | Daughtry ........................... 405/168 |

OTHER PUBLICATIONS

"Laying Underwater Pipelines by Float and Chains Method", *Ocean Resources Engineering*, Apr. 1978.
"Second End Flowline Connection Without Length Adjustment", Paper No. 01C-3074, Tenth Annual Offshore Technology Conference, Houston, Texas, May 8-11, 1978.

*Primary Examiner*—David H. Corbin
*Attorney, Agent, or Firm*—Stephen A. Littlefield

[57] ABSTRACT

A flow line bundle assembly includes a plurality of conduits disposed within a tubular covering member. The tubular covering member is sealed at its ends before being placed in a body of water, so that the flow line bundle has a slight positive buoyancy when submerged in the body of water. Weights are then added to the flow line bundle to cause it to have a neutral buoyancy at a position slightly above a floor of the body of water. The flow line bundle is then towed from its point of construction, through the body of water, to the location where it is to be installed. During a first method of towing, if an obstacle located above the ocean floor is approached, a trailing tug increases a restraining force applied to the flow line bundle so as to lift it above the obstacle as the flow line bundle passes over the obstacle. A second method of towing maintains the flow line bundle at a constant depth below a surface of the body of water so that the bundle will clear any obstacles on the floor of the body of water. After the flow line bundle is connected between the subsea wellhead and a producing platform located within the body of water, the space between the conduits and the tubular covering member is flooded to sink the flow line bundle to the ocean floor and to provide heat transfer between the conduits and the tubular covering member.

4 Claims, 17 Drawing Figures

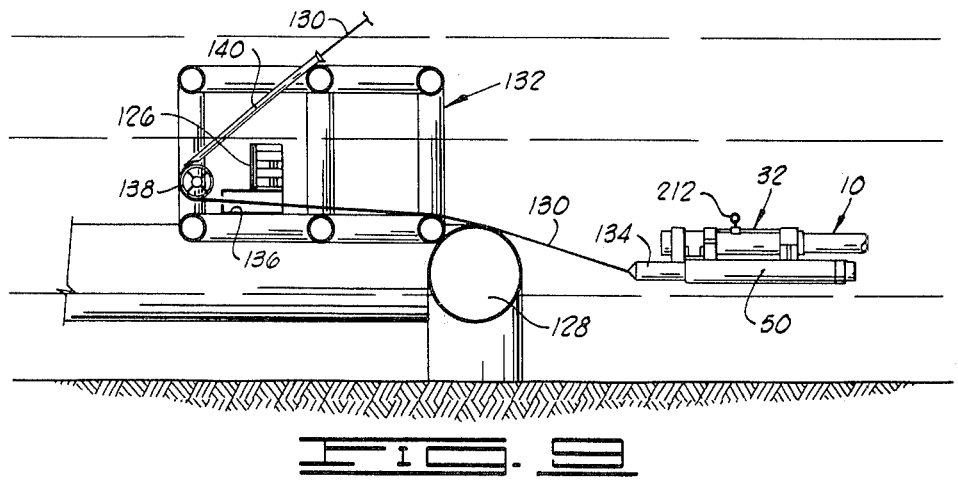
FIG. 9
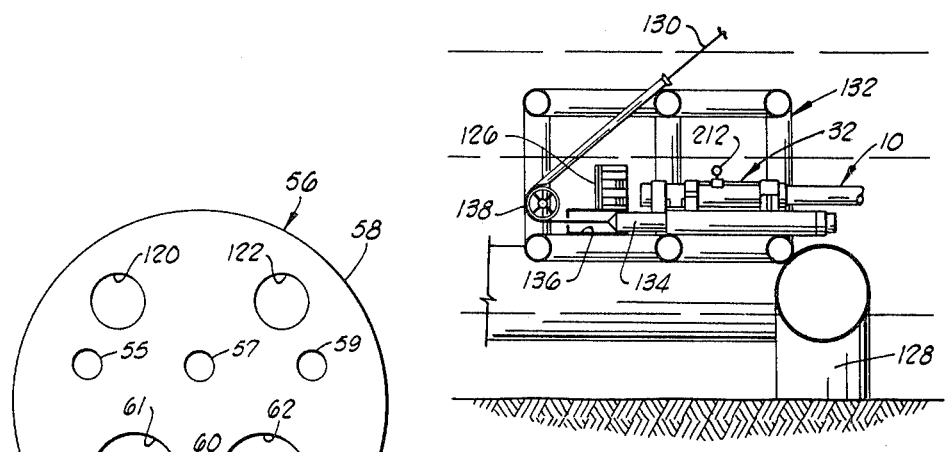
FIG. 8
FIG. 10
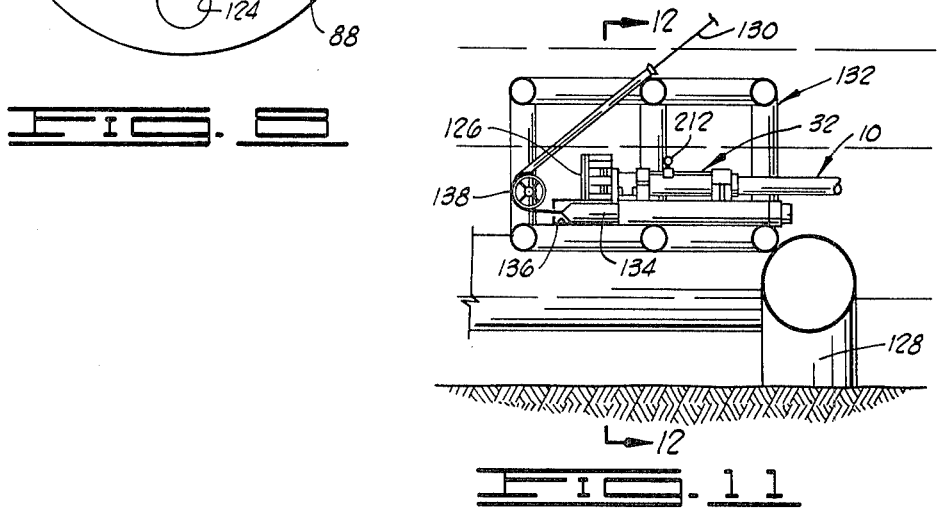
FIG. 11

FLOW LINE BUNDLE AND METHOD OF TOWING SAME

This is a continuation of application Ser. No. 048,316 filed June 14, 1979, now U.S. Pat. No. 4,363,566.

BACKGROUND OF THE INVENTION

1. Field of the Invention

This invention relates to flow lines located between two points within a body of water, and more particularly, but not by way of limitation, it relates to a flow line bundle including a plurality of flow lines disposed in a tubular covering member.

2. Description of the Prior Art

U.S. Pat. Nos. 3,677,302 and 3,526,086, both to Morgan, each show pluralities of conduits disposed within a tubular covering member. In U.S. Pat. No. 3,526,086, however, the space between the conduits and the covering member is filled with a solid material 30, so that such a space could not be filled with sea water. In U.S. Pat. No. 3,677,302, the tubular covering member includes a plurality of articulated joint portions, and the covering member is not sealed at those joints, so that the combination of the conduits and the covering member would never be buoyant. Furthermore, the structure disclosed in U.S. Pat. No. 3,677,302 comprises a riser assembly, rather than a flow line bundle.

U.S. Pat. Nos. 4,120,168 and 4,052,862, both to Lamy, disclose a single conduit located within a tubular covering. Spacers are connected between the conduit and the covering, and a space between the conduit and the covering may be filled with water.

The prior art includes methods of towing a tubular member through a body of water by constructing the tubular member so that it is neutrally buoyant at a position located above a floor of the body of water, with weight means partially engaging the floor of the body of the water. Such a structure is shown for example in U.S. Pat. No. 4,107,933 to Lamy. Other disclosures of that general type are shown in U.S. Pat. No. 4,135,844 to Lamy, U.S. Pat. No. 4,011,729 to Kermel, U.S. Pat. No. 3,262,275 to Perret and U.S. Pat. No. 4,145,909 to Daughtry.

Additionally U.S. Pat. No. 4,145,909 shows, at FIG. 8 thereof, a method for pulling in an end of a tubular member for connection to a subsea structure. Another apparatus for pulling in an end of a tubular member for connection to a subsea structure is disclosed in Paper No. OIC-3074 entitled "Second End Flowline Connection Without Length Adjustment" presented at the Tenth Annual Offshore Technology Conference in Houston, Tex., during the period of May 8-11, 1978, and that same apparatus is also disclosed in an article entitled "Laying Underwater Pipelines By Float and Chains Method" in the April, 1978 issue of *Ocean Resources Engineering*.

U.S. Pat. No. 2,297,165 to Ringel shows several versions of spacer members for locating one tubular member inside another tubular member.

SUMMARY OF THE INVENTION

In connecting two points within a body of water, such as a subsea wellhead and a producing platform, it is generally necessary to lay several lines between the wellhead and the platform. The present invention provides an improved method of constructing and installing a flow line bundle including such a plurality of lines between the subsea wellhead and the platform. A plurality of fluid conducting conduits is disposed within a tubular covering member. A plurality of longitudinally spaced spacer means are connected to said conduits to retain the conduits in a spaced relationship from the tubular covering member. A manifold member including a plurality of ports is attached to each end of the conduits so as to provide fluid communication between the ends of the conduits and the ports of the manifold members. A cap means is sealingly engaged with an end of each of the manifold members to prevent water from entering said ports.

The flow line bundle just described is constructed on land and then is towed to the installation site. The bundle has a slight positive buoyancy when it is not hampered by additional weight other than the structure of the bundle just described. Additional weight means such as chains or the like are then attached to the bundle to cause it to have a neutral buoyancy at a point a short distance above a floor of said body of water with said weight means partially engaging said floor. Then a towing tug is attached to a leading end of the flow line bundle by a first flexible line, and a restraining tub is attached to a trailing end of the flow line bundle by a second flexible line.

The flow line bundle is then towed in a catenary fashion between the two tugs to the point of installation. This may be done by either of two basic methods.

By a first method, the flow line bundle is towed at a short, relatively constant distance above the ocean floor with the chains or other weight means engaging the ocean floor. During the course of the towing operation, if obstacles are encountered which are located above the ocean floor, the trailing tug will increase the restraining force being applied to the second flexible line so as to lift the flow line bundle off the ocean floor and cause it to "fly" over the obstacle on the ocean floor.

The second method is similar to the first, except that the restraining tug continually applies a restraining force during the towing operation, sufficient to maintain the flow line bundle at a controlled distance from the surface of the body of water. The weight means generally do not engage the ocean floor during the towing procedure of the second method.

When the bundle is finally brought to the point of installation, the cap means are removed from the ends of the flow line bundle and the ends of the bundle are attached to the subsea wellhead and the producing platform. Then the space between the conduits and the tubular covering member of the flow line bundle is flooded with sea water so as to cause the bundle to sink to the ocean floor.

Additionally, one of the fluid conducting conduits generally conducts a relatively high temperature fluid. The presence of the sea water surrounding the high temperature conduit serves to transfer that heat relatively evenly to the other conduits and to the tubular covering. The transfer of heat to the other conduits causes all the conduits to expand substantially equally due to the thermal expansion, so that relative differences in the thermal expansion between conduits are minimized. The transfer of heat to the outer covering member serves to transfer the heat completely away from the flow line bundle by conducting it through the covering member to the body of water.

It is therefore a general object of the present invention to provide an improved construction for a subsea flow line bundle.

Yet another object of the present invention is the provision of a subsea flow line bundle including a plurality of fluid conducting conduits disposed in a tubular covering member.

Another object of the present invention is the provision of an improved method for towing a flow line bundle or other tubular member through a body of water.

Yet another object of the present invention is the provision of a towing method for a tubular member through a body of water which provides a means for lifting the tubular member above the obstacles upon the ocean floor.

Yet another object of the present invention is the provision of an improved method for connecting a subsea flow line bundle between two points within a body of water.

Other and further objects, features and advantages of the present invention will be readily apparent to those skilled in the art upon a reading of the following disclosure in conjunction with the drawings.

BRIEF DESCRIPTION OF THE DRAWINGS

FIG. 2 also illustrates the appearance of the flow line bundle when it is being towed at a controlled depth below the ocean surface.

FIG. 8 is an end view of the manifold member of FIG. 7 illustrating the location of the various ports within the manifold member.

FIG. 9 is a schematic elevation view of the sled which has been connected to a pull-in line connected to the producing platform.

FIG. 10 is another schematic elevation view similar to FIG. 9, showing the sled partially in place within the sled receiving module of the producing platform.

FIG. 11 is another view similar to FIG. 9, showing the sled completely pulled into the sled receiving module and showing the fluid connector connected to the manifold member of the sled.

FIG. 12 shows the cap removing assembly in its unactuated position.

DETAILED DESCRIPTION OF THE PREFERRED EMBODIMENTS

Figure 1:
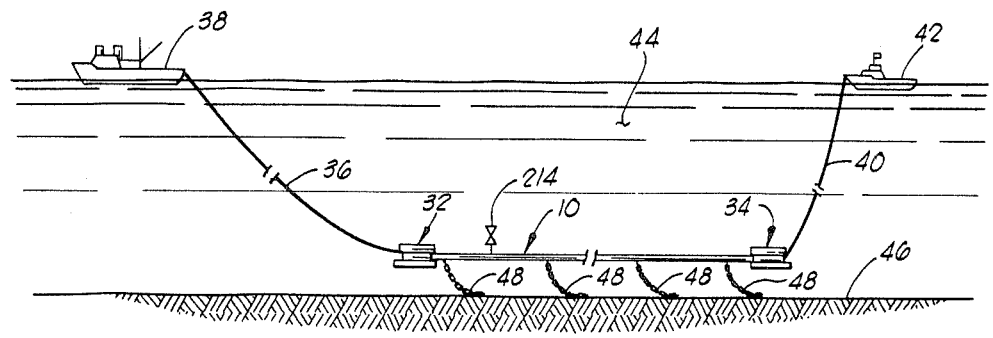
FIG. 1 is a schematic elevation view of the flow line bundle suspended a few feet above the ocean floor and being towed between two tugs in a catenary fashion.
Figure 2:
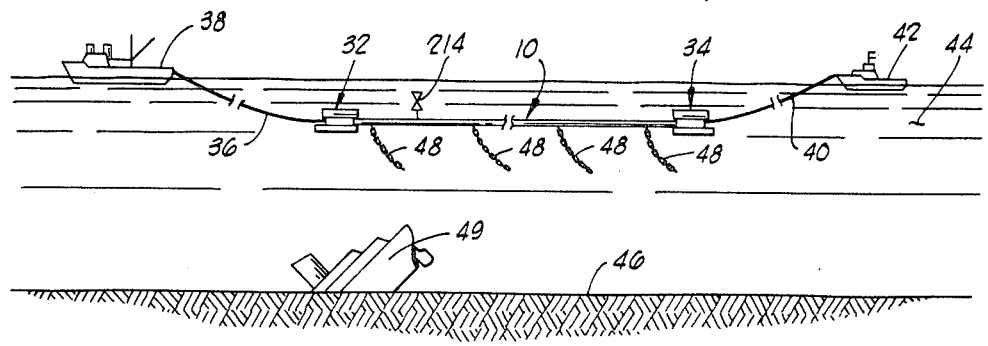
FIG. 2 is a schematic elevation view of the flow line bundle of FIG. 1 when the trailing tug exerts sufficient restraining force to lift the flow line bundle above an obstacle on the ocean floor as the flow line bundle is being towed.

Referring now to the drawings and particularly to FIGS. 1 and 2, the flow line bundle of the present invention is shown and generally designated by the numeral 10. Flow line bundle 10 may be a mile or more in length.

Figure 3:
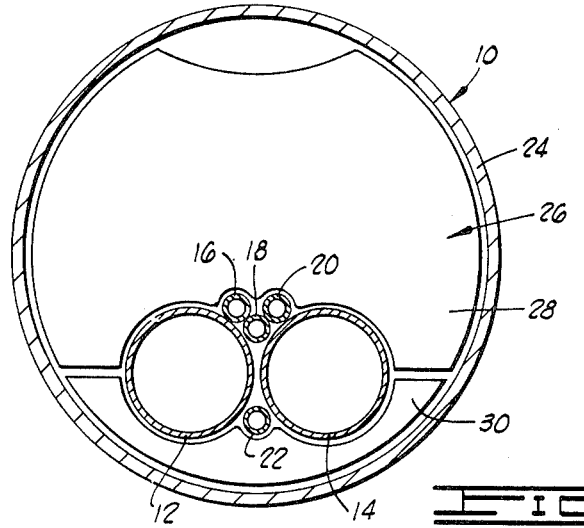
FIG. 3 is a cross-sectional view of the flow line bundle showing the conduits located within the tubular covering member and showing one of the spacer members.
Figure 4:
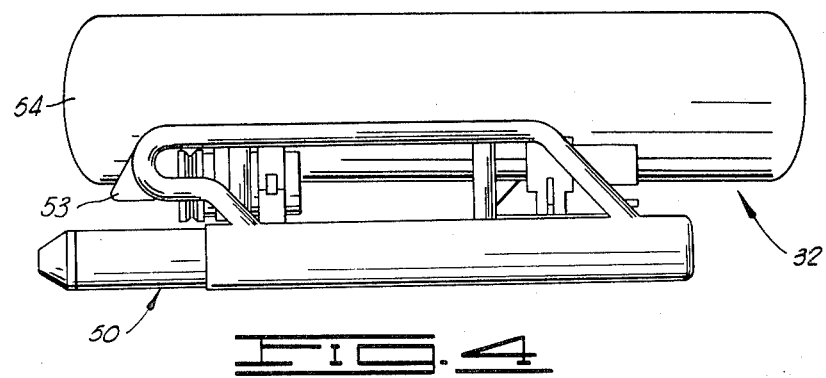
FIG. 4 is a side elevation view of the leading sled of the flow line bundle.

As is best shown in FIG. 3, the flow line bundle 10 includes a plurality of fluid conducting conduits 12, 14, 16, 18, 20 and 22. The conduits 12-22 are located within an outer tubular covering member 24. By way of example only, in one embodiment of the present invention, conduits 12 and 14 are $3\frac{1}{2}$ inch diameter flow lines. Conduits 16, 18, 20 and 22 are 0.84 inch diameter hydraulic control lines. Tubular covering 24 has a $12\frac{3}{4}$ inch outside diameter.

Due to the remote location of the subsea well, and the difficulty of servicing the same, it is desirable that conduits 12 and 14 be constructed to allow pump down type service tools to pass therethrough. To that end the welds on conduits 12 and 14 should not protrude inward past the inner surface thereof.

A polyurethane spacer, generally designated by the numeral 26, is connected about the conduits 12-22 and holds the same in a spaced relationship from an inner surface of the outer covering member 24. The spacer member 26 includes first and second spacer components 28 and 30 which are connected together by a plurality of bolts (not shown), or the like. A plurality of similar spacer members (not shown) are longitudinally spaced from spacer member 26 at intervals of approximately fifteen feet along the length of the conduits 12-22.

As seen in FIG. 3, it is desirable to locate the conduits 12-22 toward the bottom side of covering 24 so that the center of gravity of the flow line bundle is below the center of buoyancy of the flow line bundle.

Referring again to FIGS. 1 and 2, the flow line bundle 10 includes at its leading end a leading flow line sled assembly 32. At its trailing end the flow line bundle 10 includes a trailing flow line sled assembly 34.

A first flexible line 36 is connected between the leading end of the flow line bundle 10 and a towing tub 38 which may also be described as a powered floating vessel. A second flexible line 40 is connected between the trailing end of flow line bundle 10 and a trailing tug 42.

The flow line bundle 10 is constructed on land and the ends thereof are sealed as will later be described. The conduits and the space between the conduits and the tubular covering member 24 is then generally pressurized to around 200 psig with nitrogen gas or the like. The flow line bundle 10 is constructed so as to have a positive buoyancy of approximately $\frac{1}{2}$ pound per foot when submerged in the body of water 44 prior to the addition of any weight means.

It is desired that when the flow line bundle 10 is being towed through the body of water 44, that the flow line bundle 10 float either just above a floor 46 of the body of water 44, or at a controlled depth below the surface of the body of water as shown in FIG. 2. This is referred to as a buoyant off-bottom tow method.

A plurality of weight means 48 are attached to the flow line bundle 10 to cause the flow line bundle to have a neutral buoyancy, at a position such as that illustrated in FIG. 1, several feet above the ocean floor 46, with the weight means 48 partially engaging the ocean floor. Similar weight means are shown for example in U.S. Pat. No. 4,145,909 to Daughtry.

By a first method, the flow bundle 10 is towed in the manner illustrated in FIG. 1, with the towing force being exerted by the towing tug 38 and with the trailing tug 42 exerting slight restraining force on second flexible line 40 to control the trailing end of flow line bundle 10.

It is not uncommon, as the flow line bundle 10 is being towed through the body of water 44, for obstacles such as shipwreck 49 or the like, which are located above the ocean floor 46, to be encountered. Other such obstacles might also include subsea pipelines (not shown) or the like.

The present invention provides a novel method of avoiding underwater obstruction 49 in a manner illustrated in FIG. 2. As the flow line bundle 10 approaches the obstacle 49, the trailing tug 42 increases a reverse thrust thereof to increase a retarding force applied to second flexible line 40 so as to lift the flow line bundle 10 to a position, illustrated in FIG. 2, a considerable distance above the ocean floor 46, so that the flow line 10 is located above the obstacle 49 as it passes thereover.

The manner of towing the flow line bundle 10 illustrated in FIGS. 1 and 2 is often referred to as towing the flow line in a catenary configuration. That is, the first and second flexible lines 36 and 40 and the flow line bundle 10 roughly approximate the shape of a catenary suspended between the leading and trailing vessels 38 and 42. Of course they do not form a true catenary due to the lack of flexibility and the nonuniformity of the weight distribution across the entire system suspended between the towing and trailing vessels, 38 and 42.

When the retarding force on the second flexible line means 40 is increased, the shape of the catenary is changed causing it to have a much larger radius of curvature along its various points and thereby causing the middle portion of the catenary defined by the flow line bundle 10 to be raised above the ocean floor 46.

Alternatively, by a second method, the trailing vessel 42 continually applies a restraining force sufficient to maintain the flow line bundle 10 at a controlled distance below the surface of the body of water 44, i.e. the flow line bundle 10 is generally maintained in the configuration shown in FIG. 2 throughout the towing procedure.

The specific depth below the surface at which the flow line bundle 10 should be towed depends upon many factors, one of which is the roughness of the sea at the time of the towing operation. Generally, the rougher the surface conditions are, the greater the towing depth should be so that the affect upon the flow line bundle 10 from the rough sea is minimized.

The depth at which the flow line bundle 10 is towed may be controlled in many ways. One way is to measure the depth by sonic means or by pressure sensing means. Another way is to control the distance between the leading and trailing vessels 38 and 42, which may be done with the aid of a radar type apparatus located on the vessels to measure that distance.

Referring now to FIGS. 4-7, the leading sled 32 is thereshown. Leading sled 32 includes a frame assembly 50 with floatation tanks 52 and 54 attached thereto. Frame 50 includes lugs 53 to which flexible line 36 may be attached.

Figure 5:
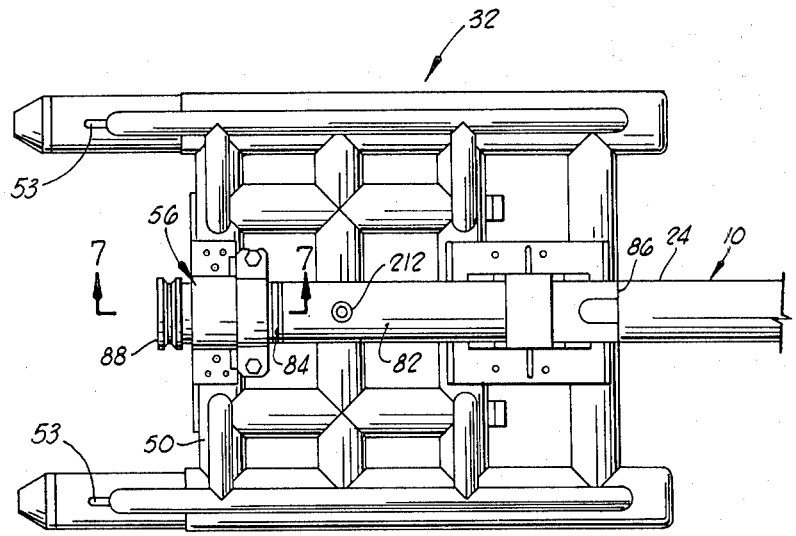
FIG. 5 is a top plan view of the sled of FIG. 4, with the floatation tanks removed to allow the other components to be more clearly seen.
Figure 5:
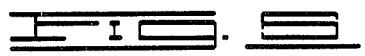
Figure 6:
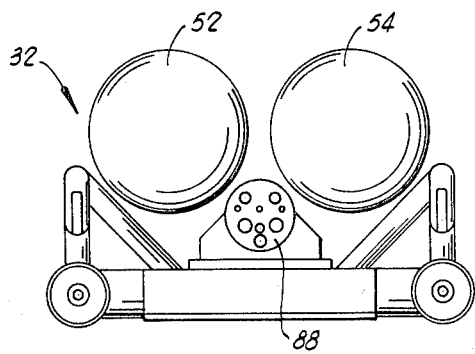
FIG. 6 is an end view of the sled of FIG. 4.

FIG. 5 is a plan view of sled assembly 32 with the floatation tanks 52 and 54 removed.

Figure 7:
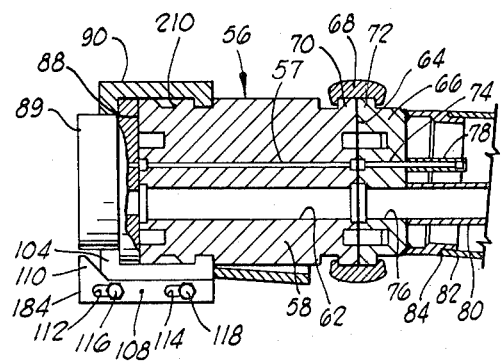
FIG. 7 is a sectional view, taken along line 7—7 of FIG. 5, showing a cross-sectional view of one of the manifold members of the flow line bundle.
Figure 7:
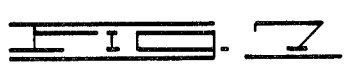

A manifold member 56 is attached to frame 50. Manifold member 56 includes a manifold block 58 which has a plurality of ports 55, 57, 59, 60, 61, and 62 disposed therethrough, as seen in FIG. 8, for communication with conduits 16, 18, 20, 22, 12 and 14, respectively. It is noted that FIG. 7 is a schematic illustration, and the ports 57 and 62 thereshown are actually oriented in accordance with FIG. 8. An end 64 of manifold block 58 is attached to a manifold extension 66 by a clamping ring 68 which engages outwardly extending flanges 70 and 72 of manifold block 58 and manifold extension 66, respectively.

Manifold extension 66 includes ports 74 and 76 communicating with ports 57 and 62, respectively, of manifold block 58. Stub extensions 78 and 80 extend from manifold extension 66 and communicate with ports 74 and 76, respectively. Manifold extension 66 includes other ports and stub extensions corresponding to ports 55, 59, 60 and 61.

Each of the relatively smaller conduits 16, 18, 20 and 22 has an end thereof welded to a stub extension such as stub extension 78. This provides fluid communication between the small conduits and one of the relatively smaller ports such as port 74 of manifold extension 66.

Each of the relatively larger conduits 12 and 14 is welded to a stub extension such as stub extension 80 to provide fluid communication with one of the relatively larger ports, for example, port 76 of manifold extension 66.

After the welding of the conduits 12-22 to the stub extensions, such as extensions 78 and 80, of manifold extension 66 of manifold member 56, a tubular covering extension 82 is then welded at its first end 84 to manifold extension 66 and at its second end 86 to tubular covering 24. The tubular covering extension 82 may be considered to be a portion of the tubular covering member 24.

Another end 88 of manifold block 58 is sealingly engaged by a cap means 89 when the flow line bundle 10 is first assembled. The cap means 89 is connected to manifold block 58 by a cap retaining collar assembly 90, and prevents sea water from entering conduits 12-22 and covering 24 so that flow line bundle 10 has a positive buoyancy when submerged in water.

Figure 12:
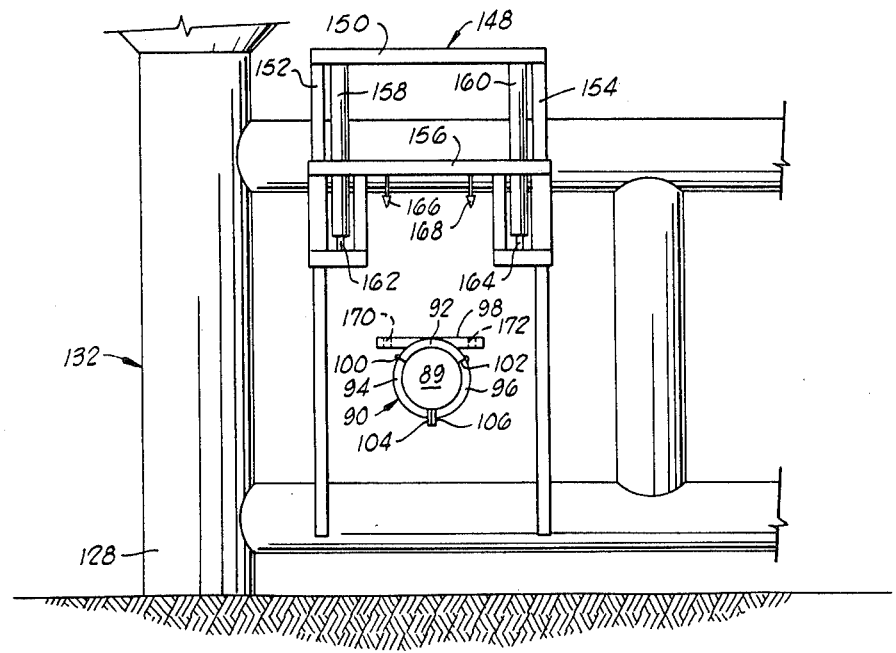
FIG. 12 is a schematic elevation view taken along line 12—12 of FIG. 15 prior to the connection of the fluid connector to the manifold member.

As may best be seen in FIG. 12, the cap retaining collar assembly 90 includes first, second and third arcuate collar portions 92, 94 and 96.

The first arcuate collar portion 92 includes a tangentially extending flange 98. The second and third collar portions 94 and 96 are each hingedly connected to first collar portion 92 at hinge points 100 and 102, respectively.

Each of the second and third arcuate collar assembly portions 94 and 96 include radially outward extending flanges 104 and 106.

As is best seen in FIG. 7, the flanges 104 and 106 are connected by a shear bolt 108. Attached to flange 104 of arcuate portion 94 is a sliding shear member 110 which includes slots 112 and 114 disposed about connecting bolts 116 and 118.

The shear pin 108 may be sheared by moving sliding shear member 110 longitudinally relative to cap retaining collar assembly 90. When shear bolt 108 is sheared, the second and third arcuate collar portions 94 and 96 separate and the collar assembly 90 may be removed.

Figure 15:
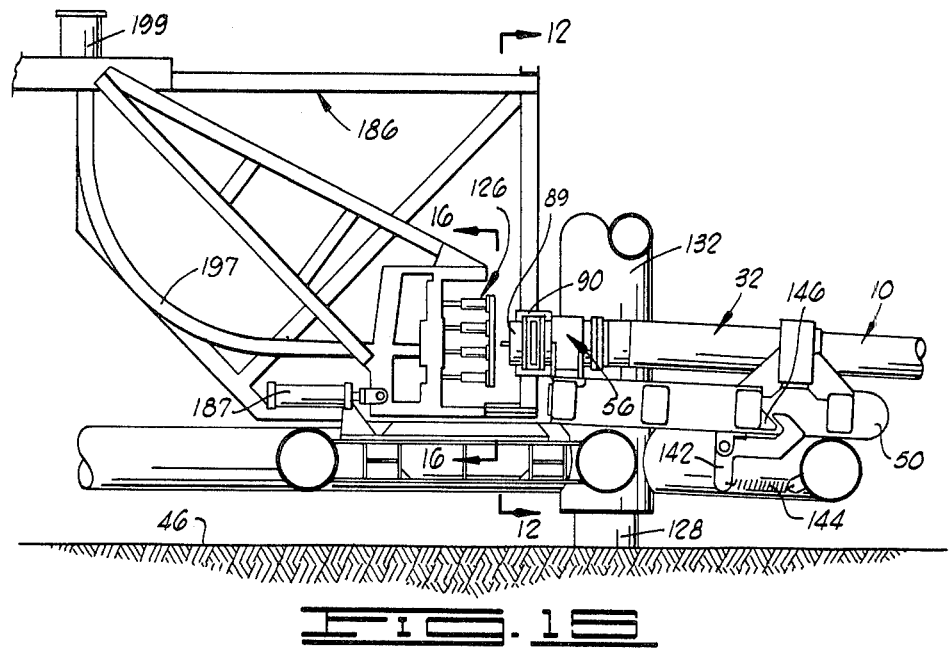
FIG. 15 is a schematic elevation view, similar to FIG. 11, illustrating the fluid connector and illustrating the spring loaded sled locking assembly.
Figures 16, 17:
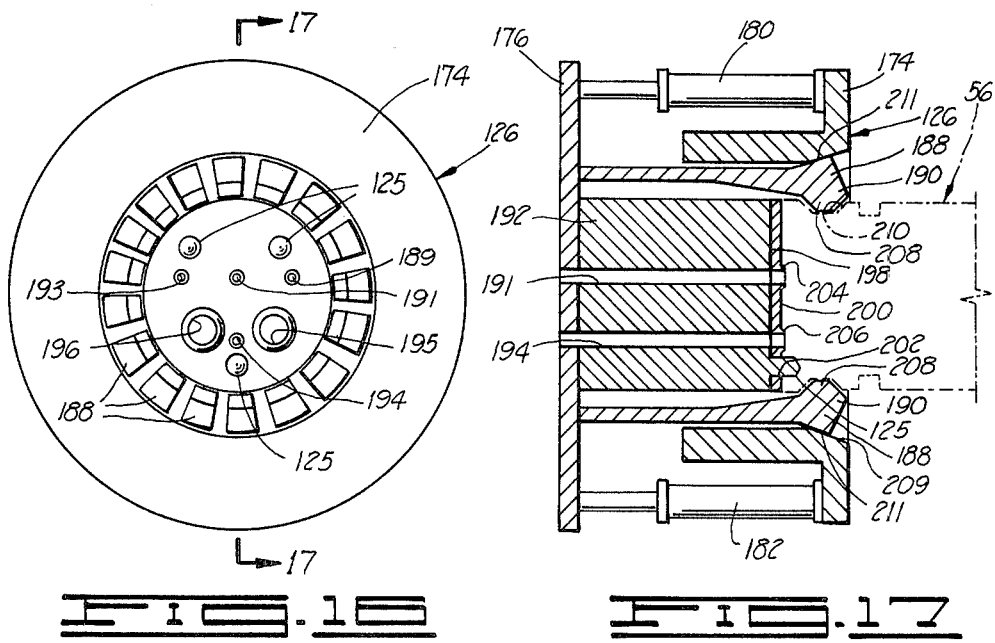
FIG. 16 is an elevation view of the fluid connector, taken along line 16—16 of FIG. 15.
FIG. 17 is a sectional schematic elevation view of the fluid connector, taken along line 17—17 of FIG. 16.

FIG. 8 is an enlarged view of second end 88 of manifold block 58 showing the various ports thereof. Additionally alignment blind bores 120, 122 and 124 are included for engagement with alignment stubs 125 of a fluid conductor assembly 126 attached to production platform 128. The fluid conductor assembly 126 is best illustrated in FIGS. 15-17.

After the flow line bundle 10 has been towed through the body of water 44 to a location closely adjacent the two points to be connected within the body of water, i.e. adjacent the subsea wellhead (not shown) at one end, and adjacent the producing platform 128 at the other end, the ends of the flow line bundle are connected to the subsea wellhead and the producing platform 128 in substantially the following manner.

The manner of connection of the leading end of flow line bundle 10 to the producing platform 128 will be described for the purpose of this disclosure. The connection of the other end is done in a similar manner.

As shown in FIG. 9, a pull-in cable 130 is connected between leading sled 32 and a sled receiving module 132 of producing platform 128. The pull-in cable 130 is preferrably connected between a leading nose portion of a cylindrical frame extension 134 of frame 50 of sled assembly 32, and is then threaded through a cylindrical frame extension receiver 136 and then is threaded through a system of pulleys 138 and guides 140 which direct the cable 130 to a position on producing platform 128 located above the surface of the body of water 44. Then the first flexible line 36 is disconnected from flow line bundle 10.

The pull-in cable 130 is then retrieved, thereby pulling leading sled assembly 32 into place within sled receiving module 132. FIG. 10 shows leading sled assembly 32 partially pulled into sled receiving module 132 so that the cylindrical frame extension 134 is just engaged with the cylindrical frame extension receiver 136. FIG. 11 shows leading sled assembly 32 pulled completely into its final position within sled receiving module 132.

FIG. 15 is a view similar to FIG. 11 showing some additional components of the sled receiving module 132. It will be understood stood that both FIGS. 9-11 and FIG. 15 are schematic in form and no attempt has been made to superimpose all of the apparatus of the sled receiving module 132 in any one figure.

In FIG. 15 the leading sled assembly 32 is shown in its fully pulled-in position, in place within sled receiving module 132. When lead sled assembly 32 is in the fully pulled-in position, a latching member 142 is resiliently urged by means of spring member 144 into engagement with a latching cam 146 of frame 50 of sled assembly 32.

FIG. 15 illustrates leading sled assembly 32 with the cap means 89 still retained in place upon manifold member 56 by cap retaining collar assembly 90. That is the position those components will be in when the leading sled assembly 32 is first pulled into place within sled receiving module 132. Then the other end of the flow line bundle 10 will be similarly pulled into place within a similar sled receiving module (not shown) of the subsea wellhead assembly (not shown). It is noted that it may sometimes be preferrable to pull-in the end adjacent the subsea wellhead first.

The next operation which must be conducted is to remove the sealing cap means 89 from manifold member 56 so that the manifold member 56 may then be connected to fluid connector assembly 126.

The manner in which cap retaining collar assembly 90 and sealing cap means 89 are removed is best described with relation to FIGS. 12-15. FIG. 12 is an elevational view taken along line 12—12 of FIG. 15. An end view is thereshown of sealing cap means 89 and cap retaining collar assembly 90, the components of which have been previously described. For purpose of a clear illustration, the other components of leading sled assembly 32 have not been shown in FIG. 12.

Located about cap retaining collar assembly 90 is a cap removal apparatus assembly 148 which is attached to producing platform 128. The cap removal apparatus 148 includes a frame 150 having vertical frame legs 152 and 154. A sliding cap retrieval frame 156 is slidably disposed upon vertical legs 152 and 154. First and second hydraulic cylinders 158 and 160 are extendably connected between cap removal apparatus frame 150 and cap retrieval frame 156 so that cap retrieval frame 156 may be moved downward from the position shown in FIG. 12 by extension of pistons 162 and 164 of hydraulic cylinders 158 and 160, respectively.

Cap retrieval frame 156 includes first and second prongs 166 and 168 for engaging first and second prong receiving holes 170 and 172, respectively, of tangential flange 98 of cap retaining collar assembly 90.

Figures 13, 14:
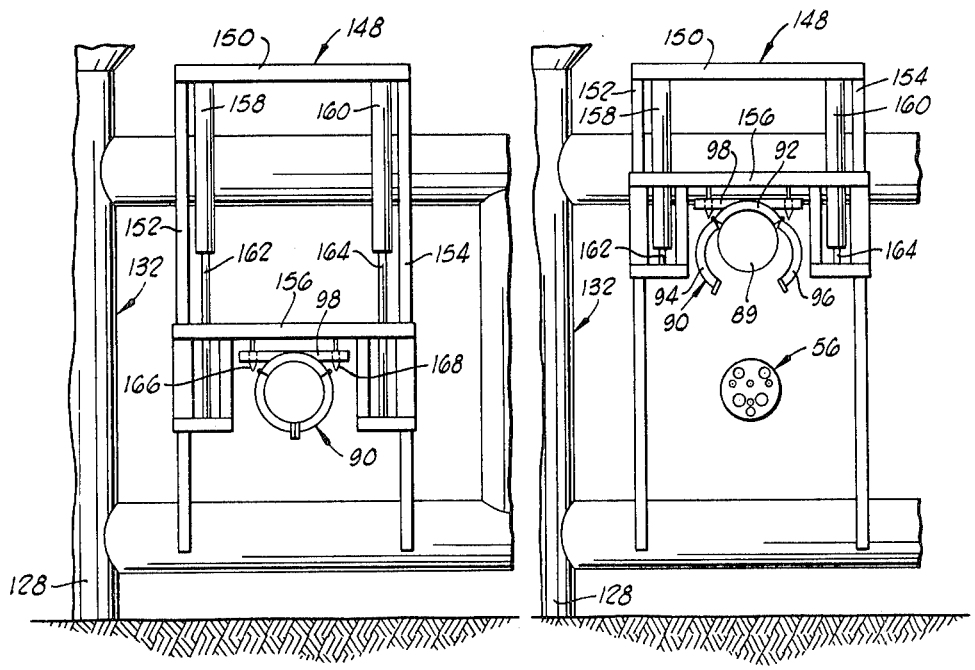
FIG. 13 is a view similar to FIG. 12 showing the cap removing assembly in its downwardmost position with the cap engaging prongs engaged with the tangentially extending flange of the cap.
FIG. 14 is a view similar to FIG. 12 with the cap removing assembly once again moved to its uppermost position having pulled the cap out of engagement with the manifold member.

The lowermost position of cap retrieval frame 156 with the prongs 166 and 168 engaging flange 98 of cap retaining collar assembly 90 is illustrated in FIG. 13.

The next step is to shear the shear bolt 108, shown in FIG. 7, connecting the second and third arcuate collar portions 94 and 96 of cap retaining collar assembly 90. This is best understood by viewing FIGS. 15 and 7. The relative initial position betwen fluid connector assembly 126 and scaling cap means 89 is approximately shown in FIG. 15.

The fluid connector assembly 126 is slidably mounted within a fluid connector assembly frame 186 so that the fluid connector assembly 126 may be moved toward manifold member 56 by extension of a hydraulic cylinder 187 connected between fluid connector assembly 126 and frame 186.

When hydraulic cylinder 187 is extended, fluid connector assembly 126 is moved toward manifold member 56 and engages a forward end 184 of sliding shear member 110 and pushes sliding shear member 110 toward cap retaining collar assembly 90 so as to shear the shear bolt 108. Fluid connector assembly 126 then is moved out of engagement with manifold member 56 by retracting hydraulic cylinder 187.

The cap retaining collar assembly 90 and sealing cap means 89 are then lifted out of engagement with manifold means 56 by retracting the pistons 162 and 164 of hydraulic cylinders 158 and 160.

Generally, when the first one of the sealing cap means 89 is removed the flow line bundle 10 will at least partially fill with water and sink to the ocean floor.

Next the fluid connector assembly 126 and manifold member 56 must be connected for fluid communication therebetween. The construction of the fluid connector assembly 126 is best shown in FIGS. 16 and 17. FIG. 16 is an end view taken along line 16—16 of FIG. 15.

It is noted that FIGS. 16 and 17 are only schematic illustrations of fluid connector assembly 126. Fluid connector assembly 126 includes an annular body member 174 connected to an end frame 176 by hydraulic rams 180 and 182.

Located within annular body 174 are a plurality of longitudinally extending fingers 188 which are resiliently connected to fluid connector assembly 126 so that the free ends of 190 of fingers 188 may be deflected radially outward and inward.

Fluid connector assembly 126 includes an inner body 192 having a plurality of ports 189, 191, 193, 194, 195 and 196, for fluid communication with ports 55, 57, 59, 60, 61, and 62, respectively, of manifold member 56. A platform conduit bundle 197, as seen in FIG. 15, is connected at one end to the ports of fluid connector assembly 126 and has a second end connector assembly 199 for connection to a riser tube assembly (not shown) leading to the surface of the body of water 44.

Adjacent an end face 198 of inner body 192 is a metal gasket 200. Metal gasket 200 includes a plurality of holes 202 disposed therein for allowing alignment stubs 125 of inner body 192 to protrude therethrough.

Adjacent each of the ports 191 and 194 are frustoconical raised portions 204 and 206 for sealing engagement with the ports 57 and 60, respectively, of manifold member 56. Similar frustoconical surfaces are located adjacent ports 189, 192, 195 and 196. Each of the frustoconical sections preferrably includes a resilient sealing ring (not shown) disposed therein as will be understood by those skilled in the art.

The free ends 190 of longitudinally extending fingers 188 all include radially inward projecting tongue portions 208 which engage an annular groove 210 disposed about a cylindrical outer surface of manifold member 56. To lock fingers 188 into engagement with groove 210, the pistons of hydraulic rams 180 and 182 are extended to the position shown in FIG. 17, so that a tapered annular surface 209 of annular body 174 engages tapered radially outer surfaces 211 of fingers 188 and deflects fingers 188 toward groove 210.

When tongue portions 208 engage groove 210, the manifold member 56 is locked in sealing engagement with metal gasket 200 so that fluid communication is provided between the conduits 12-22 and their respective ports within inner body 192 of fluid connector assembly 126 through the ports of manifold member 56.

After the ends of the flow line bundle 10 have been connected to the subsea wellhead (not shown) and the producing platform 128, it is desirable to insure that all of the space between conduits 12-22 and outer tubular covering member 24 is completely filled with sea water. This is accomplished in the following manner.

As is seen in FIG. 5, a first valve means or bleed-off orifice 212 is connected to tubular covering extension 82, and upon opening of first valve means 212 the space between conduits 12-22 and tubular covering 24 is communicated with the body of water 44.

As is best seen in FIGS. 1 and 2, a second valve means 214 is longitudinally spaced from first valve means 212 away from leading sled assembly 32. Upon opening the second valve means the space between conduits 12-22 and outer covering 24 is placed in fluid communication with the body of water 44.

The purpose of having first and second valve means 212 and 214 is to insure that all of the gases contained within the tubular covering 24 may be easily bled off. The connections to the subsea wellhead assembly (not shown) and the producing platform 128 are typically located approximately 10 feet above the ocean floor 46. Therefore, when the middle portion of flow line bundle 10 is laying on the ocean floor the first valve means 212 is the high point in the bleed-off system. Sea water enters the second valve means 214 and gases within the covering member 24 escape through the first valve means 212. A similar bleed-off is performed at the other end of flow line bundle 10.

At about the same time that covering 24 is flooded, the buoyancy tanks 52 and 54 of sleds 32 and 34 are also flooded.

Typically one of the relatively large conduits 12 and 14 is used to conduct hydrocarbons produced from the subsea well to the producing platform. These hydrocarbons often have a temperature relatively higher than that of the body of water 44 and of the other conduits and tubular covering member disposed in the body of water.

By flooding the space between conduits 12-22 and covering member 24 with sea water, the heat from the relatively high temperature conduit, for example conduit 12, is transmitted to the other conduits 14-22 and to the outer covering member 24. The outer covering member 24 in turn conducts much of this heat outward to the body of water. The flooding of the space between conduits 12-22 and covering member 24 with water provides an advantage, as opposed to the situation which would exist with a similar system without the flooding, in that by transmitting heat from conduit 12 to the other conduits, the temperature of the conduits is maintained much more nearly equal than would otherwise be the case, so that differences in thermal expansion of the conduits are minimized. Additionally by conducting heat to the tubular covering 24 and outward into the body of water 44, problems of thermal expansion are further reduced.

Thus, the flow line bundle and method of installing the same of the present invention are well adapted to carry out the objects and attain the ends and advantages mentioned, as well as those inherent therein. While presently preferred embodiments of the invention have been described for the purpose of this disclosure, numerous changes in the construction and arrangement of parts can be made by those skilled in the art, which changes are encompossed with the spirit of this invention as defined by the appended claims.

The embodiments of this invention in which an exclusive property or privilege is claimed are defined as follows:

1. An off-bottom tow method for transporting a tubular member from one location to another within a body of water and clearing an obstacle present within said body of water, said method comprising the steps of:
   connecting a first flexible line between a leading end of said tubular member and a towing means;
   connecting a second flexible line between a trailing end of said tubular member and a retarding means;
   pulling said first flexible line forward to pull said tubular member through said body of water; and
   increasing a retarding force applied to said second line, when approaching said obstacle located in said body of water above said floor, to lift said tubular member above said obstacle.

2. The method of claim 1, wherein:
   said step of pulling said first flexible line is further characterized as towing said first flexible line with a first powered floating vessel; and
   said step of increasing a retarding force is further characterized as increasing a reverse thrust of a second powered floating vessel attached to said second flexible line.

3. An off-bottom tow method for transporting a tubular member from one location to another within a body of water, said method comprising the steps of:
connecting a first flexible line between a leading end of said tubular member and a first powered floating vessel;
connecting a second flexible line between a trailing end of said tubular member and a second powered floating vessel; and
towing said first flexible line forward with said first powered vessel to pull said tubular member through said body of water; while
maintaining said tubular member above a floor of said body of water at a controlled depth below a surface of said body of water.

4. The method of claim 3, wherein said step of maintaining is further characterized as maintaining said tubular member at a depth sufficiently small enough to allow said tubular member to clear an obstacle located within said body of water above said floor thereof.

* * * * *